W. B. MUMBRUE.
Churn-Dasher.

No. 207,888.        Patented Sept. 10, 1878.

Witnesses:
Clarence Poole
W. H. Morsell

Inventor:
Wm. B. Mumbrue
per atty.
A. H. Evans & Co.

UNITED STATES PATENT OFFICE.

WILLIAM B. MUMBRUE, OF MONTOUR, IOWA.

IMPROVEMENT IN CHURN-DASHERS.

Specification forming part of Letters Patent No. 207,888, dated September 10, 1878; application filed June 29, 1878.

*To all whom it may concern:*

Be it known that I, WILLIAM B. MUMBRUE, of Montour, in the State of Iowa, have invented a new and useful Improvement in Churn-Dashers, of which the following specification is a full, clear, and exact description, reference being had to the accompanying drawings, making part of this specification, in which—

Figure 1:
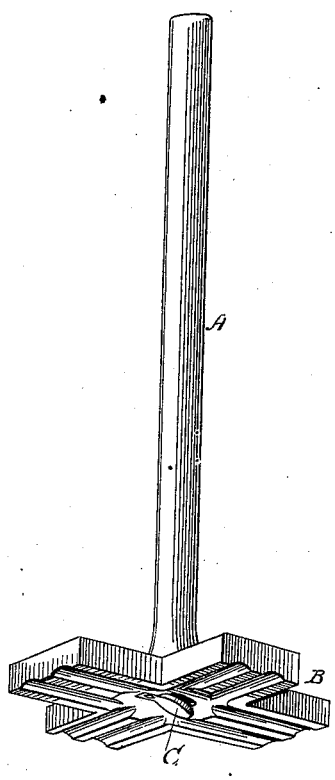
Figure 2:
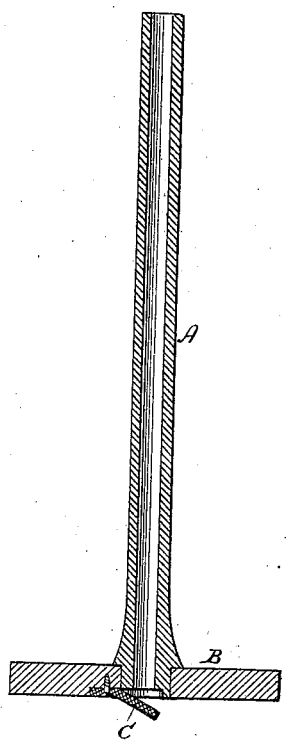

Figure 1 represents a churn-dasher with my improvements attached. Fig. 2 is a vertical section of the same.

My invention relates to that class of dashers used for churning butter, and known as "aerating dashers;" and it consists in the construction and combination of parts, as hereinafter explained and claimed.

To enable others skilled in the art to make and use my invention, I will proceed to describe the exact manner in which I have carried it out.

It is well known that butter is the product of the mechanical and chemical forces brought into exercise in process of churning, there being no butter in the cream itself. The change of the animal oil in the cream to butter is largely due to the absorption of oxygen by the butter globules; and the condition necessary for completely oxidizing the globules is that they be each brought into intimate contact with the air. Therefore that process which most completely effects the exposure of globules to the air will produce the best results in quantity and quality of the product.

In the drawings, A represents a hollow or tubular handle, and B the dasher attached thereto, made in any convenient form to allow the dasher to pass freely into and through the body of the cream. This dasher has a flat or corrugated face, and may be made in any desired form, the plane of the face being at right angles to the handle, and being provided at its center with opening sufficient to admit the the lower end of the tubular handle where it is secured. By this construction I secure a free passage of atmospheric air through the hollow handle of the dasher directly into the churn. Immediately at the bottom of the handle, and flush with the face of the dasher, I attach a valve, C, by any convenient means, and so arranged as to open for the admission of air as the dasher is drawn upward and close as the dasher descends. By this construction I substantially exclude the cream from entering the air-passage in the handle, which, if permitted, would soon clog up the passage, interrupt the working of the dasher, and necessitate a constant cleaning of the handle. To avoid these difficulties, I place the valve at the bottom of the air-passage, and on the descent of the dasher the valve is instantly closed.

The operation of my dasher is as follows: As the dasher is raised a vacuum is created beneath it, into which the atmospheric air freely rushes through the hollow handle, the valve C opening for its admission. Then, when the dasher descends, a copious supply of air is caught beneath the face of the dasher and is forced down in minute bubbles into the body of the cream, producing a violent agitation, which brings each butter-globule into direct contact with the bubbles of air, and renders the process of churning comparatively easy and very rapid.

I am aware that hollow handles for churn-dashers are not new, nor do I claim such as my invention; but

What I claim as new, and desire to secure by Letters Patent, is—

A churn-dasher constructed as described, and consisting of the hollow handle A, the dasher B, having the plane of its face at right angles to the handle, and the valve C, set flush with the face of the dasher, substantially as and for the purpose set forth.

WILLIAM B. MUMBRUE.

Attest:
  LEWIS MATTHEWS,
  L. BINGHAM.